United States Patent
Reid et al.

(10) Patent No.: US 9,484,148 B1
(45) Date of Patent: Nov. 1, 2016

(54) POWER SYSTEM FOR GROUND-BASED MACHINES

(71) Applicant: The Boeing Company, Chicago, IL (US)

(72) Inventors: Eric M. Reid, Kenmore, WA (US); Matthew R. DesJardien, Kenmore, WA (US); Steven A. Best, Marysville, WA (US); Daniel Mark McDonagh, Seattle, WA (US); William Goodridge Westgard, Edmonds, WA (US); Carlos D. Crespo, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 663 days.

(21) Appl. No.: 13/933,620

(22) Filed: Jul. 2, 2013

(51) Int. Cl.
*H01F 38/00* (2006.01)
*H01F 38/14* (2006.01)

(52) U.S. Cl.
CPC .................................... *H01F 38/14* (2013.01)

(58) Field of Classification Search
CPC ....................................................... H01F 38/14
See application file for complete search history.

(56) References Cited

U.S. PATENT DOCUMENTS

| | | | | |
|---|---|---|---|---|
| 2012/0038223 | A1* | 2/2012 | Harakawa | H01F 38/14 307/109 |
| 2012/0187757 | A1* | 7/2012 | Wechlin | B60L 11/182 307/9.1 |
| 2014/0323040 | A1* | 10/2014 | Rhein | B60L 5/005 455/41.1 |

OTHER PUBLICATIONS

"Product Overview Inductive Power Transfer—IPT", Conductix wampfler, 2012, Applicant Supplied.*
"Inductive Power Transfer (IPT) Test Track Open in SuperiorControls Plymouth, MI Manufacturing Center," PR Worldwide, Inc., Nov. 2012, 2 pages, accessed Aug. 9, 2013. http://www.pr.com/press-release/457583.
"Product Overview: Inductive Power Transfer—IPT," Conductix-Wampfler, copyright 2012, 16 pages, accessed Jun. 25, 2013. http://www.conductix.us/sites/default/files/downloads/Brochure_-_Inductive_Power_Transfer_-_IPT.pdf.

* cited by examiner

*Primary Examiner* — Jared Fureman
*Assistant Examiner* — Joel Barnett
(74) *Attorney, Agent, or Firm* — Yee & Associates, P.C.

(57) ABSTRACT

A method for distributing energy to a group of ground-based machines. The energy is supplied to the group of ground-based machines through a pattern of inductive power transfer lines physically associated with a ground in a work area. Operations are performed with the group of ground-based machines in the work area. The group of ground-based machines moves in the work area without following a path based on the inductive power transfer lines.

18 Claims, 12 Drawing Sheets

POWER SYSTEM FOR GROUND-BASED MACHINES

BACKGROUND INFORMATION

1. Field

The present disclosure relates generally to manufacturing and, in particular, to manufacturing objects using ground-based machines. More particularly, the present disclosure relates to a method and apparatus for providing power to ground-based machines.

2. Background

In manufacturing products, an assembly line may be used in a manner where parts are added to form the product in a sequential manner to create a finished product more quickly. Human operators and robotic equipment may be positioned along the assembly line to perform the assembly of the product.

With ground-based machines, such as robotic equipment, power cables may be connected to the robotic equipment to provide power for performing operations in manufacturing products. Often times, these power cables may be grouped using large umbilical cords. The umbilical cords, however, take up room and may become tangled when robotic equipment is moved around. Additionally, movement of equipment may cause inconsistencies in the umbilical cords such that the umbilical cords do not provide a desired amount of power and may require maintenance.

Inductive power transfer systems may be used to remove the need for power cords for robotic equipment and other ground-based machines that may be used to manufacture products. Many of the currently available inductive power transfer systems are designed for use on assembly lines such as those used to manufacture products, such as automobiles. Robotic equipment may be positioned along the assembly line to perform operations.

Changes in the product or manufacturing process may result in the repositioning of robotic equipment along the assembly line. In some cases, the robotic equipment may move some distance along the assembly line in performing operations to manufacture the product. This type of inductive power transfer system, however, may not provide a desired amount of flexibility for manufacturing products that may not be on a traditional assembly line system.

Therefore, it would be desirable to have a method and apparatus that takes into account at least some of the issues discussed above, as well as other possible issues.

SUMMARY

In one illustrative embodiment, an apparatus comprises a group of ground-based machines and a power system. The group of ground-based machines is configured to perform operations in a work area having a pattern of inductive power transfer lines physically associated with a ground in the work area. The power system is configured to obtain energy for the group of ground-based machines from the pattern of inductive power transfer lines such that the group of ground-based machines move in the work area without following a path based on the inductive power transfer lines.

In another illustrative embodiment, a wireless power transfer system comprises a power source and a pattern of inductive power transfer lines physically associated with a ground in a work area and connected to the power source. The power source is configured to generate energy. The pattern of inductive power transfer lines is configured for a group of ground-based machines to move in the work area without following a path based on the inductive power transfer lines.

In yet another illustrative embodiment, a method for distributing energy to a group of ground-based machines is presented. The energy is supplied to the group of ground-based machines through a pattern of inductive power transfer lines physically associated with a ground in a work area. Operations are performed with the group of ground-based machines in the work area. The group of ground-based machines moves in the work area without following a path based on the inductive power transfer lines.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that inductive power transfer systems used on assembly lines are set up using a fixed path. The fixed path is located along the assembly line. As a result, ground-based machines that use inductive power are unable to move away from the assembly line.

The illustrative embodiments recognize and take into account that the use of set paths such as those in assembly lines are not as useful when manufacturing is performed using stations rather than in assembly lines where the product moves continuously along the assembly line. The illustrative embodiments recognize and take into account that the lines used in inductive power transfer systems on assembly lines are laid out as tracks. The ground-based machines may move along those tracks and are unable to leave or move away from the tracks without losing power. The illustrative embodiments recognize and take into account that currently used ground-based machines that are powered by inductive power transfer systems require a precise alignment with the lines embedded in the ground.

The illustrative embodiments recognize and take into account that when manufacturing products in stations, ground-based machines may move in different directions within the work area. The illustrative embodiments recognize and take into account that the tracks used in inductive power transfer systems for assembly lines are not conducive to the type of movement used by ground-based machines manufacturing products in a work area.

Thus, the illustrative embodiments provide a method and apparatus for providing power to ground-based machines. In one illustrative embodiment, an apparatus includes a group of ground-based machines and a power system. The group of ground-based machines is configured to perform operations in a work area having a pattern of inductive power transfer lines physically associated with the ground in the work area. The power system is configured to provide power to the group of ground-based machines from the pattern of inductive power transfer lines such that the group of ground-based machines moves in the work area without following a path based on the power transfer lines.

Figure 1:
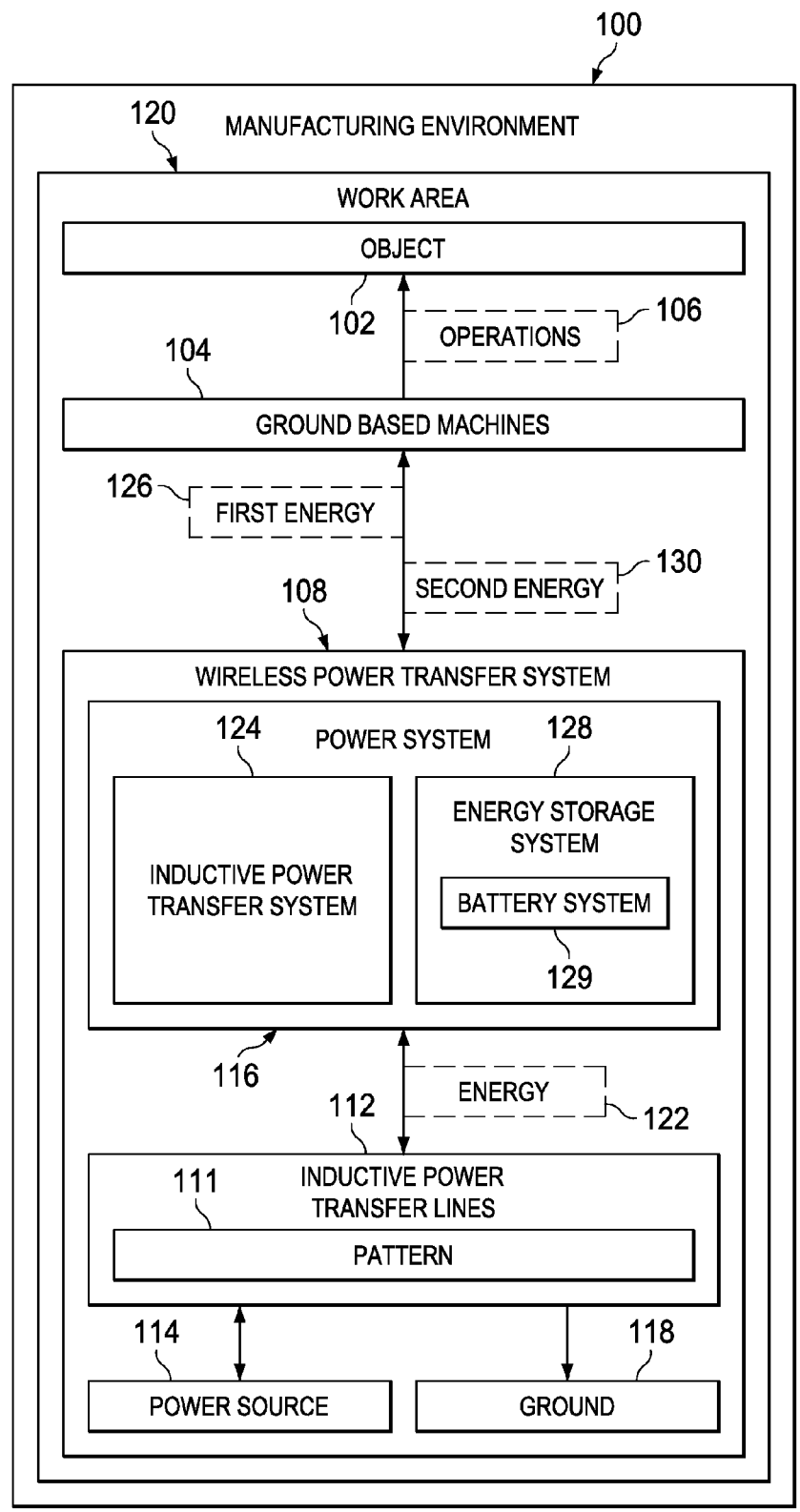
FIG. 1 is an illustration of a block diagram of a manufacturing environment in accordance with an illustrative embodiment.

With reference now to the figures, and in particular, with reference to FIG. 1, an illustration of a block diagram of a manufacturing environment is depicted in accordance with an illustrative embodiment. In this illustrative example, manufacturing environment 100 is environment in which object 102 may be manufactured.

In this illustrative example, object 102 may take various forms. For example, object 102 may be selected from one of a mobile platform, a stationary platform, a land-based structure, an aquatic-based structure, and a space-based structure. More specifically, object 102 may be an aircraft, a surface ship, a tank, a personnel carrier, a train, a spacecraft, a space station, a satellite, a submarine, an automobile, a wing, a stabilizer, a fuselage section, an engine, an engine housing, and other suitable types of objects.

As depicted, ground-based machines 104 perform operations 106. Ground-based machines 104 may take various forms. In these illustrative examples, ground-based machines 104 are mobile. Ground-based machines 104 may be, for example, a robotic arm, a crawler, a support platform, a portable drilling system, a portable tooling stand, an operator console, an autonomous navigating tool, a part storage container, a portable lifting jack, a portable metrology system, a portable measurement system, a composite layup machine, a portable forming tool, moveable power drop boxes, and other suitable types of machines.

The performance of operations 106 is part of manufacturing object 102. Operations 106 may include assembling parts, drilling holes, inspecting parts, inspecting assemblies of parts, applying coatings, bonding parts, installing fasteners, vacuuming, sanding, welding, reworking, modifying parts, manufacturing operations, maintenance operations, and other suitable types of operations.

As depicted, a group of ground-based machines 104 is powered using wireless power transfer system 108. As used herein, a "group of" when used with reference items means one or more items. For example, a group of ground-based machines 104 is one or more ground-based machines 104. In the illustrative examples, the group of ground-based machines 104 may be some or all of ground-based machines 104.

In this illustrative example, wireless power transfer system 108 may use inductive power transfer. When wireless power transfer system 108 uses inductive power transfer, the energy transferred is a form of energy transmission without the use of man-made conductors. Inductive power transfer may take a number of different forms. For example, inductive power transfer may be performed using direct induction, resonant magnetic induction, or other suitable types of induction.

In this illustrative example, wireless power transfer system 108 includes a number of different components. For example, wireless power transfer system 108 may include pattern 111 of inductive power transfer lines 112, power source 114, power system 116, and other suitable types of components.

Pattern 111 of inductive power transfer lines 112 are power transfer lines physically associated with ground 118 in work area 120 in manufacturing environment 100. When one component is "physically associated" with another component, the association is a physical association in the depicted examples. For example, a first component, inductive power transfer lines 112, may be considered to be physically associated with a second component, ground 118, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, extension of the second component, or both.

In these illustrative examples, pattern 111 of inductive power transfer lines 112 may be physically associated with ground 118 by being embedded in the ground or floor. In some illustrative examples, inductive power transfer lines 112 may be on the surface of the floor of ground 118, partially in ground 118 and partially exposed on the surface of ground 118, or physically associated in some other manner.

Pattern 111 of inductive power transfer lines 112 are configured to provide energy 122 inductively to the group of ground-based machines 104. The configuration is such that the group of ground-based machines 104 may move within work area 120 without following a track or path based on inductive power transfer lines 112. In other words, the group of ground-based machines 104 is able to move within work area 120 without following a path defined by inductive power transfer lines 112.

As depicted, pattern 111 of inductive power transfer lines 112 may be configured such that the group of ground-based machines 104 may move between inductive power transfer lines 112 without losing an ability to obtain energy 122 between inductive power transfer lines 112. For example, when moving from a first power transfer line to a second power transfer line in pattern 111 of inductive power transfer lines 112, a ground-based machine in ground-based machines 104 may be able to obtain energy 122 from the second power transfer line before being unable to obtain a desired amount of energy 122 from the first inductive power transfer line.

Power source 114 may be one or more sources of energy. Power source 114 is connected to pattern 111 of inductive power transfer lines 112. Power source 114 is configured to supply electrical energy to pattern 111 of inductive power transfer lines 112. As depicted, power source 114 may take a number of different forms. For example, power source 114 may include at least one of an alternating current (AC) power outlet, a generator, or other suitable types of power sources.

As used herein, the phrase "at least one of", when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In this illustrative example, power system 116 is configured to obtain energy 122 for the group of ground-based machines 104 from pattern 111 of inductive power transfer lines 112. Energy 122 is used to power the group of ground-based machines 104. The manner in which energy 122 is obtained is such that the group of ground-based machines 104 may move in work area 120 without following a path based on the inductive power transfer lines in pattern 111 of inductive power transfer lines 112. Of course, although the group of ground-based machines 104 are not required to follow the inductive power transfer lines, the group of ground-based machines 104 may follow the inductive power transfer lines.

As depicted, power system 116 may include a number of different components. For example, power system 116 may include inductive power transfer system 124.

As depicted, inductive power transfer system 124 is physically associated with ground-based machines 104. Inductive power transfer system 124 is configured to obtain energy 122 from pattern 111 of inductive power transfer lines 112. In other words, inductive power transfer system 124 is configured to generate first energy 126 in energy 122.

First energy 126 is used by the group of ground-based machines 104 to perform operations 106.

Additionally, power system 116 also may include energy storage system 128. In this illustrative example, energy storage system 128 may be implemented using battery system 129.

Energy storage system 128 may store energy 122 obtained from pattern 111 of inductive power transfer lines 112. Energy 122 stored in energy storage system 128 may be used to provide energy 122 that is stored to power the group of ground-based machines 104. In other words, energy storage system 128 may generate second energy 130 from energy 122 stored in energy storage system 128. Energy storage system 128 generates second energy 130 to perform at least one of replacing first energy 126 when inductive power transfer system 124 is unable to generate first energy 126, or supplementing first energy 126 when additional energy is needed.

As a result, an interruption in the delivery of energy 122 to ground-based machines 104 may be reduced or eliminated. The supply of energy, such as first energy 126 and second energy 130 for desired operation of ground-based machines 104 may occur without operator intervention.

In this manner, the group of ground-based machines 104 may perform operations 106 with more flexibility than available with currently used inductive power transfer systems designed for assembly line processing. For example, the group of ground-based machines 104 may move throughout work area 120 without following a path defined by a power transfer line. In particular, the group of ground-based machines 104 may move within work area 120 where pattern 111 of inductive power transfer lines 112 is present. Additionally, when energy storage system 128 is present, the group of ground-based machines 104 may also move within work area 120 and other locations where pattern 111 of inductive power transfer lines 112 is absent.

Figure 2:
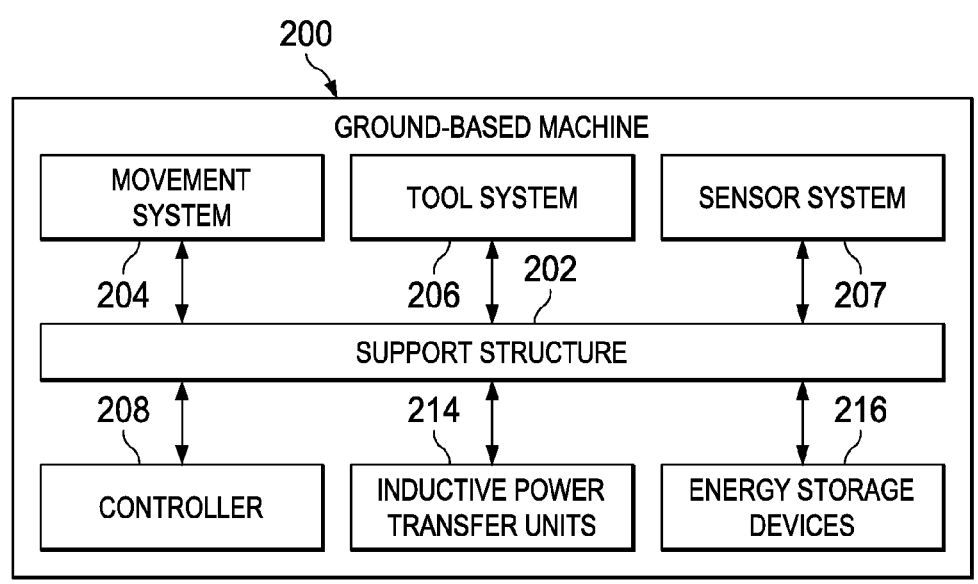
FIG. 2 is an illustration of a block diagram of a ground-based machine in accordance with an illustrative embodiment.

Turning now to FIG. 2, an illustration of a block diagram of a ground-based machine is depicted in accordance with an illustrative embodiment. Ground-based machine 200 is an example of one implementation for a ground-based machine in ground-based machines 104 in FIG. 1.

As depicted, ground-based machine 200 includes a number of different components. For example, ground-based machine 200 includes support structure 202, movement system 204, tool system 206, sensor system 207, controller 208, a group of inductive power transfer units 214, and a group of energy storage devices 216.

Support structure 202 is a physical structure configured to provide support for other components within ground-based machine 200. For example, support structure 202 may be at least one of a frame, a housing, or other suitable structures. Other components in ground-based machine 200 may be physically associated with support structure 202.

In this illustrative example, movement system 204 is configured to move ground-based machine 200. Movement system 204 may include a motor and movement elements. The movement elements may be selected from at least one of a wheel, a track, or other suitable types of movement elements that may provide mobility for ground-based machine 200.

As depicted, tool system 206 includes one or more tools that may be used to perform operations 106 in FIG. 1. Tool system 206 may include at least one of a fastener installer, a drill, a paint applicator, a sealant applicator, a part holder, an eddy current inspection system, an ultrasonic inspection system, an x-ray inspection system, a laser inspection system, a robot, an operator console, a light scanner, a welding head, a vacuum system, a composite material applicator, a tool storage unit, a consumables storage unit, an automated tool selector, a consumables selector, or other suitable types of tools.

In the illustrative example, sensor system 207 is configured to generate information about the environment around ground-based machine 200. Sensor system 207 may include, for example, a camera, an ultrasonic sensor, an infrared sensor, a magnetic field sensor, a radio frequency identifier tag reader, and other suitable types of sensors.

For example, a magnetic field sensor in sensor system 207 may be used to identify whether an inductive power transfer line in inductive power transfer lines 112 is present. Additionally, the magnetic field sensor may be used to identify the location and orientation of other inductive power transfer lines in inductive power transfer lines 112. In another illustrative example, the radio frequency identifier tag reader may be used to identify the location of radio frequency identifier tags in work area 120 in FIG. 1. These radio frequency identifier tags may be used as markers to identify the locations of inductive power transfer lines 112. In addition, the radio frequency identifier tags may include position information that may be used for navigation.

Controller 208 is a hardware system that may include software, firmware, or a combination of the two. When software is used, the operations performed by controller 208 may be implemented in program code configured to run on a processor unit in controller 208. When firmware is used, the operations performed by controller 208 may be implemented in program code and data and stored in persistent memory to run on a processor unit.

The hardware in controller 208 may include circuits that operate to perform the operations. In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Controller 208 is configured to control operation of ground-based machine 200. Controller 208 may control the operation of at least one of movement system 204, tool system 206, or other components in ground-based machine 200.

Controller 208 may have different levels of intelligence. For example, controller 208 may implement processes that include receiving input from an operator. In other illustrative examples, controller 208 may receive instructions from a computer system remote to ground-based machine 200. The computer system may provide specific instructions such as where to move, how to position tools, when to operate tools, and other similar types of operations.

In other illustrative examples, controller 208 may have a higher level of intelligence. Controller 208 may perform tasks such as drilling holes in a pattern. Controller 208 may receive a task for drilling holes and an identification of the pattern. Controller 208 may then perform the task without additional input from a human operator or another computer system. With this level of intelligence, controller 208 may include an artificial intelligence system, a neural network, a fuzzy logic system, or some other suitable type of system.

The group of inductive power transfer units 214 is an example of components within inductive power transfer system 124 in FIG. 1. As depicted, the group of inductive power transfer units 214 is configured to obtain energy 122 from pattern 111 of inductive power transfer lines 112. In the illustrative example, the group of inductive power transfer units 214 obtains energy 122 from pattern 111 of inductive power transfer lines 112. Energy 122 is used by the group of inductive power transfer units 214 to generate first energy 126. Energy 122 may be electrical energy in the form of currents flowing through inductive power transfer lines 112. In one illustrative example, magnetic fields generated through the flow of the currents may induce a flow of currents in the group of inductive power transfer units 214 to form first energy 126.

First energy 126 may be generated at a desired level when moving from a first portion of pattern 111 of inductive power transfer lines 112 to a second portion of pattern 111 of inductive power transfer lines 112. The portions may be different inductive power transfer lines within pattern 111 of inductive power transfer lines 112, different sections of an inductive power transfer line in pattern 111 of inductive power transfer lines 112, or both. For example, movement may be from a first inductive power transfer line to a second inductive power transfer line in inductive power transfer lines 112.

For example, the group of inductive power transfer units 214 may have two inductive power transfer units. The two inductive power transfer units may be configured such that at least one of the two inductive power transfer units is able to obtain a desired amount of energy 122 to generate first energy 126 for use by components in ground-based machine 200 when moving from the first portion of pattern 111 of inductive power transfer lines 112 to a second portion of pattern 111 of inductive power transfer lines 112.

For example, when moving from a first inductive power transfer line to a second inductive power transfer line, the first inductive power transfer unit obtains energy 122 from the first inductive power transfer line as ground-based machine 200 moves away from the first inductive power transfer line towards the second inductive power transfer line. The second inductive power transfer unit obtains energy 122 from the second inductive power transfer line prior to the first inductive power transfer unit being unable to obtain a desired amount of energy 122 from the first inductive power transfer line to generate first energy 126.

Alternatively, a period of time may be present when energy 122 cannot be obtained by either the first inductive power transfer unit and the second inductive power transfer unit during movement from the first inductive power transfer line to the second inductive power transfer line. In this alternative example, the amount of time is small enough that ground-based machine 200 is able to operate at a desired level during that period of time.

In still another illustrative example, when a single inductive power transfer unit is present in the group of inductive power transfer units 214, the single inductive power transfer unit may be moved or repositioned to obtain a desired level of first energy 126 during movement of ground-based machine 200 from the first inductive power transfer line to the second inductive power transfer line. The movement may be at least one of a change in location of one or more of the group of inductive power transfer units 214 or a change in orientation of one or more of the group of inductive power transfer units 214.

In yet another illustrative example, the group of energy storage devices 216 is an example of components within energy storage system 128 in FIG. 1. For example, the group of energy storage devices 216 may be selected from at least one of a battery, a fuel cell, a compressed air energy storage tank, or other suitable types of energy storage devices.

As depicted, the group of energy storage devices 216 is configured to provide second energy 130 from energy 122 stored in the group of energy storage devices 216. In this manner, second energy 130 may be used to operate ground-based machine 200 when ground-based machine 200 moves from the first inductive power transfer line to the second inductive power transfer line and the group of inductive power transfer units 214 is unable to provide a desired level of first energy 126. Of course, these different illustrative examples may apply to a first segment of an inductive power transfer line and a second segment of the same inductive power transfer line.

Additionally, when the group of inductive power transfer units 214 provides first energy 126, the group of energy storage devices 216 may generate second energy 130 to supplement first energy 126. For example, the operation of tool system 206 may require a higher level of energy than supplied by first energy 126. Second energy 130 may be generated by the group of energy storage devices 216 such that the higher level of energy is available to tool system 206.

The illustration of manufacturing environment 100 and the different components in manufacturing environment 100 in FIGS. 1 and 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sensor system 207 may be omitted from ground-based machine 200 in FIG. 2. Instead, an external sensor system may be used to generate information that may be sent to controller 208. In other illustrative examples, another controller may send instructions to controller 208 using the information generated by the external sensor system. In other illustrative examples, ground-based machine 200 may omit the group of energy storage devices 216.

Additionally, wireless power transfer system 108 may be used in other environments other than manufacturing environment 100 in FIG. 1. For example, wireless power transfer system 108 may be used in a maintenance environment in which maintenance operations are performed on object 102.

Additionally, the movement of ground-based machines 104 also may occur outside of work area 120 when energy storage system 128 is present in ground-based machines 104. Energy storage system 128 may be used to provide second energy 130 to move ground-based machines 104 to locations for storage, maintenance, or other purposes.

Further, ground-based machines 104 may be heterogeneous or homogeneous in different implementations. For example, different ground-based machines in ground-based machines 104 may have different levels of intelligence. Additionally, some ground-based machines may be used to support structures and move structures. Other ground-based machines may be used to position structures, perform drilling operations, fastening operations, bonding operations, or other suitable operations. As another illustrative example, power source 114 may be a ground-based machine in ground-based machines 104.

In another illustrative example, controller 208 in ground-based machine 200 may communicate with a master controller in work area 120. The master controller may coordinate the operation of ground-based machine 200.

Figure 3:
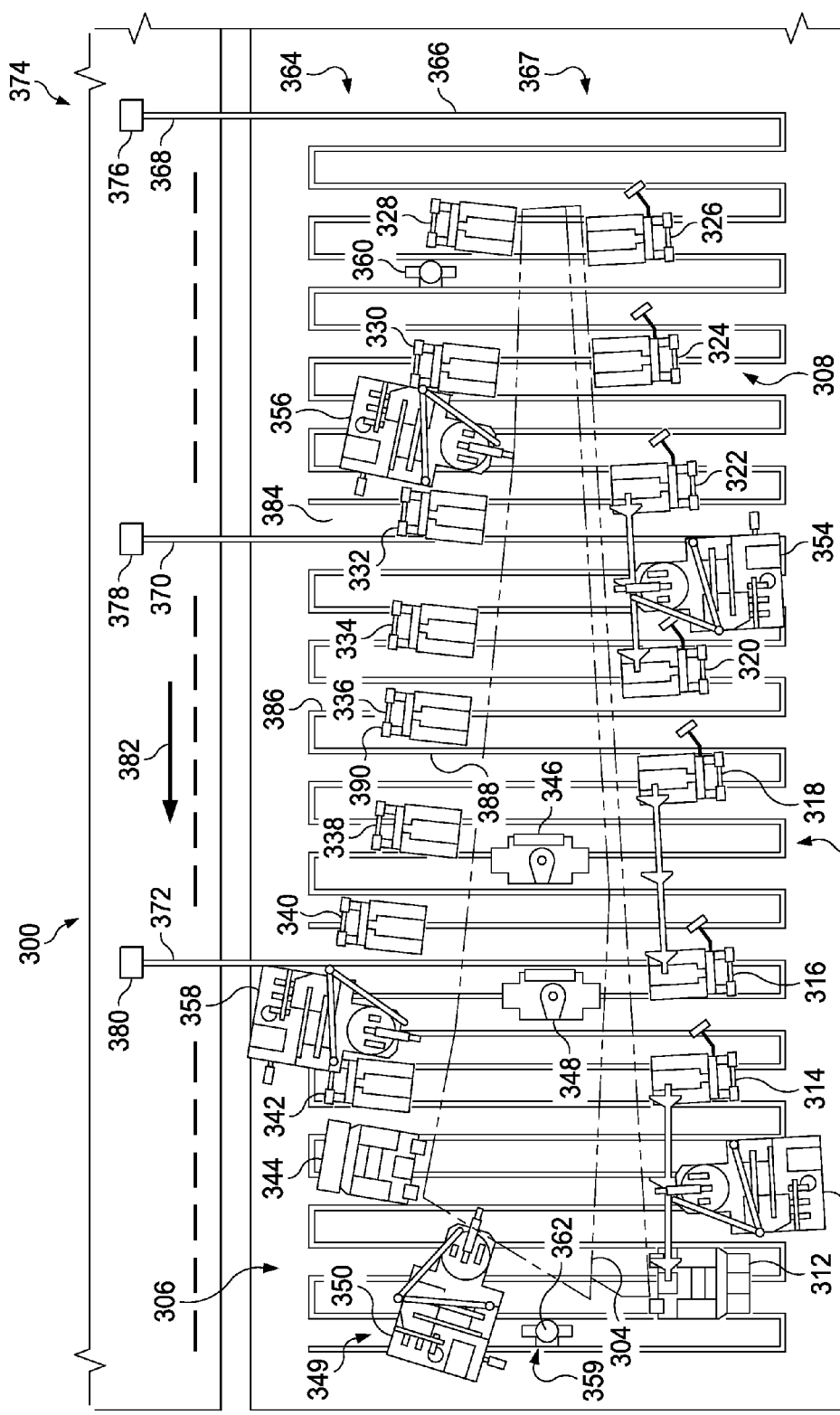
FIG. 3 is an illustration of a manufacturing environment in accordance with an illustrative embodiment.

With reference now to FIG. 3, an illustration of a manufacturing environment is depicted in accordance with an illustrative embodiment. In this illustrative example, a plan view of manufacturing environment 300 is shown. Manufacturing environment 300 is an example of one implementation for manufacturing environment 100 in FIG. 1. In this illustrative example, manufacturing environment 300 is an example of an environment in which ground-based machines 302 may operate to perform operations in manufacturing wing 304 for an aircraft in work area 306.

As depicted, first group 308 of ground-based machines 302 is configured to perform operations in work area 306. In particular, first group 308 of ground-based machines 302 is configured to hold wing 304. In this illustrative example, first group 308 of ground-based machines 302 includes ground-based machine 312, ground-based machine 314, ground-based machine 316, ground-based machine 318, ground-based machine 320, ground-based machine 322, ground-based machine 324, ground-based machine 326, ground-based machine 328, ground-based machine 330, ground-based machine 332, ground-based machine 334, ground-based machine 336, ground-based machine 338, ground-based machine 340, ground-based machine 342, ground-based machine 344, ground-based machine 346, and ground-based machine 348. As depicted, wing 304 is shown in phantom to illustrate ground-based machine 346 and ground-based machine 348 in the portion of first group 308 of ground-based machines 302 that are located under wing 304 in this view.

In particular, first group 308 of ground-based machines 302 may position and move wing 304 within work area 306. Additionally, first group 308 of ground-based machines 302 also may move wing 304 to work area 306 and from work area 306 to another work area.

As depicted, second group 349 of ground-based machines 302 is configured to perform operations on wing 304. Second group 349 of ground-based machines 302 includes ground-based machine 350, ground-based machine 352, ground-based machine 354, ground-based machine 356, and ground-based machine 358. In these illustrative examples, second group 349 of ground-based machines 302 may perform operations to assemble parts to form wing 304. Additionally, second group 349 of ground-based machines 302 also may apply coatings or other materials to wing 304.

In these illustrative examples, operators 359 are human operators that perform operations in work area 306. As depicted, operators 359 includes operator 360 and operator 362. These operations may include at least one of assembling wing 304, controlling operations of first group 308 of ground-based machines 302, controlling operation of second group 349 of ground-based machines 302, or other suitable operations.

As depicted, ground-based machines 302 in work area 306 derive power from inductive power system 364. In this illustrative example, inductive power system 364 includes pattern of inductive power transfer lines 366. As illustrated, pattern of inductive power transfer lines 366 are physically associated with ground 367 in work area 306. As depicted, pattern of inductive power transfer lines 366 includes inductive power transfer line 368, inductive power transfer line 370, and inductive power transfer line 372. Pattern of inductive power transfer lines 366 covers at a least a portion of work area 306.

Inductive power system 364 also includes power source 374. Power source 374 includes alternating current outlet 376, alternating current outlet 378, and alternating current outlet 380 in this particular example.

Pattern of inductive power transfer lines 366 has the configuration that allows for ground-based machines 302 to move within work area 306 without having to follow a particular track. Additionally, at least a portion of ground-based machines 302 are configured to store sufficient power to move between portions of pattern of inductive power transfer lines 366. These portions may be different segments in an inductive power transfer line, different inductive power transfer lines, or some combination thereof.

For example, ground-based machine 332 may move in the direction of arrow 382 from inductive power transfer line 368 to inductive power transfer line 370. During this movement, ground-based machine 332 moves across area 384 of ground 367 in work area 306 where an inductive power transfer line is absent.

As another illustrative example, ground-based machine 336 also may move in the direction of arrow 382 from first segment 386 of inductive power transfer line 370 to second segment 388 of inductive power transfer line 370. This type of movement results in ground-based machine 336 moving across area 390 of ground 367 in work area 306 where an inductive power transfer line is absent.

In these illustrative examples, this type of movement of ground-based machine 332 and ground-based machine 336 between portions of pattern of inductive power transfer lines 366 may occur with these ground-based machines obtaining energy from the pattern of inductive power transfer lines 366 through a configuration of a group of inductive power transfer units in these ground-based machines. The portions may be, for example, first segment 386 and second segment 388. The portions may be some other segment or part of pattern of inductive power transfer lines 366.

In other illustrative examples, this type of movement may occur even though the configuration of the inductive power transfer units are unable to obtain a desired level of energy form the pattern of inductive power transfer lines 366 when moving between different portions of pattern of inductive power transfer lines 366. Energy for the movement may be generated through a group of battery systems or other suitable types of energy storage systems in the ground-based machines.

Figure 4:
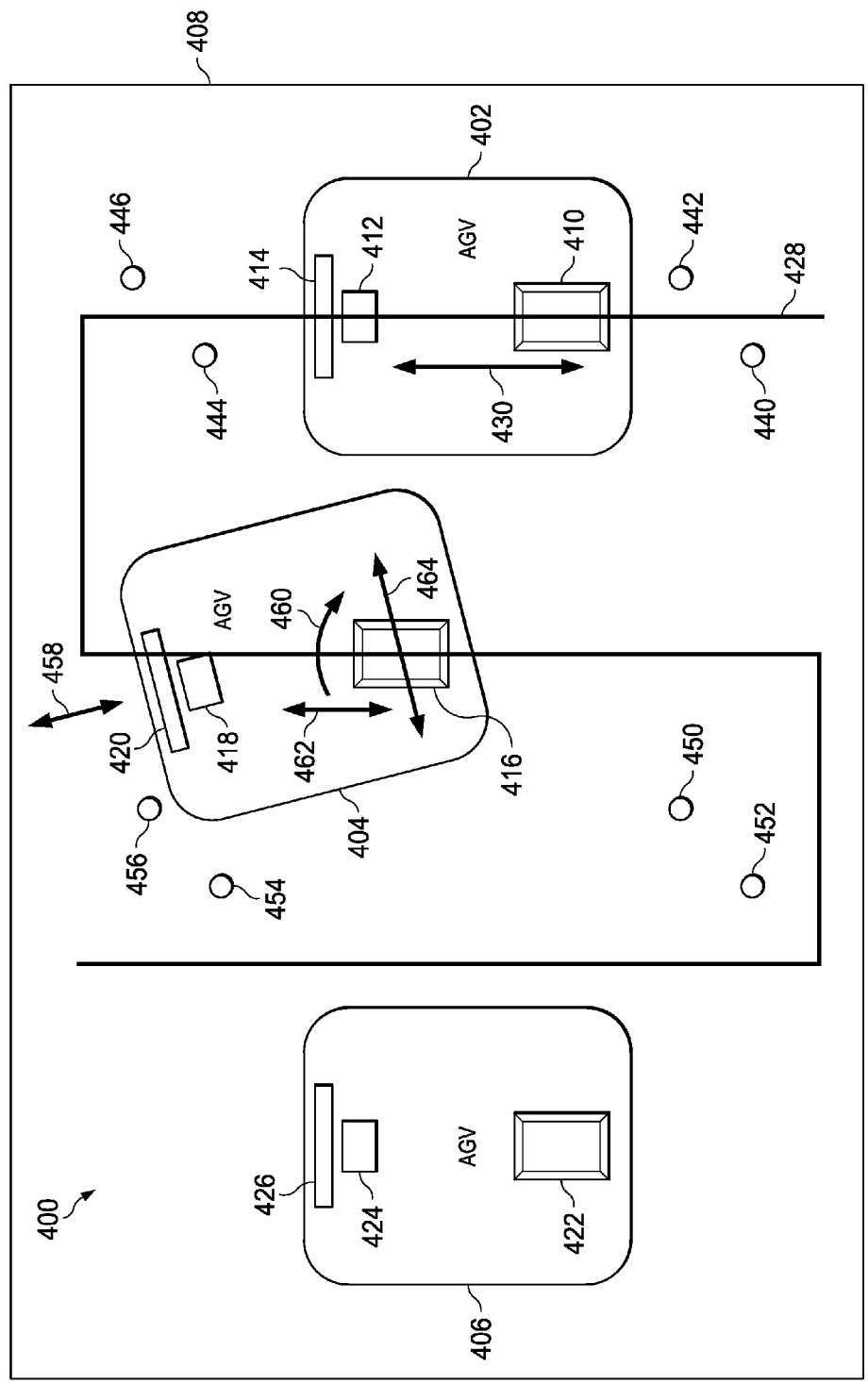
FIG. 4 is an illustration of a ground-based machine with an inductive power transfer unit in accordance with an illustrative embodiment.

Turning now to FIG. 4, an illustration of a ground-based machine with an inductive power transfer unit is depicted in accordance with an illustrative embodiment. In this illustrative example, a plan view of work area 400 with ground-based machine 402, ground-based machine 404, and ground-based machine 406 are shown. These ground-based machines are examples of an implementation for ground-based machine 200 in FIG. 2. This view is a view looking upward from below ground 408 in work area 400.

As illustrated, ground-based machine 402 includes inductive power transfer unit 410, radio frequency identifier reader 412, and magnetic detection sensor 414. Ground-based machine 404 includes inductive power transfer unit 416, radio frequency identifier reader 418, and magnetic detection sensor 420. Ground-based machine 406 includes inductive power transfer unit 422, radio frequency identifier reader 424, and magnetic detection sensor 426.

The inductive power transfer units may be implemented using any currently available inductive power pickup units. The radio frequency identifier readers may be implemented using any currently available radio frequency identifier reader. In a similar fashion, the magnetic detection sensors also may be implemented using currently available magnetic detection sensors.

In this illustrative example, inductive power transfer unit 410 has a desired position relative to inductive power transfer line 428. In this illustrative example, the position includes a location. The location may be described using two-dimensional or three-dimensional coordinates depending on the particular implementation. Additionally, the position also may include an orientation of inductive power transfer unit 410.

In this illustrative example, the orientation of inductive power transfer unit 410 is the orientation of axis 430 extending through inductive power transfer unit 410 and ground-based machine 402 relative to inductive power transfer line 428. In this particular example, this orientation provides a desired level of energy transfer from inductive power transfer line 428 to inductive power transfer unit 410.

The orientation of inductive power transfer line 428 may be identified in a number of different ways. For example, magnetic detection sensor 414 may be used to detect a magnetic field generated by inductive power transfer line 428. The information generated by magnetic detection sensor 414 may be used to identify the orientation of inductive power transfer line 428.

As another illustrative example, radio frequency identifier reader 412 may be used to read radio frequency identifier tag 440, radio frequency identifier tag 442, radio frequency identifier tag 444, radio frequency identifier tag 446, radio frequency identifier tag 450, radio frequency identifier tag 452, radio frequency identifier tag 454, and radio frequency identifier tag 456. These radio frequency identifier tags may include information such as coordinates for a location in work area 400, an indication of whether an inductive power transfer line is present at the coordinates, and other suitable information. The information from these radio frequency identifier tags may be used to identify the position of inductive power transfer line 428.

As depicted, axis 458 for ground-based machine 404 is not aligned with inductive power transfer line 428. However, the position of inductive power transfer unit 416 for ground-based machine 404 is changed to align axis 460 through inductive power transfer unit 416 with inductive power transfer line 428.

In other words, inductive power transfer unit 416 may be moved on ground-based machine 404 to maintain a desired position of inductive power transfer unit 416 relative to inductive power transfer line 428 in the present position of ground-based machine 404. For example, inductive power transfer unit 416 may be moved in the direction arrow 462 and may be rotated in the direction of arrow 464. This type of movement of inductive power transfer unit 416 on ground-based machine 404 may be performed to obtain a desired position of inductive power transfer unit 416 relative to inductive power transfer line 428. In these illustrative examples, this movement of inductive power transfer unit 416 may occur while ground-based machine 404 moves within work area 400.

As depicted, ground-based machine 406 has a position in which inductive power transfer unit 422 is not positioned over inductive power transfer line 428. In this example, a battery (not shown) in ground-based machine 406 may be used to provide energy to operate ground-based machine 406. The battery may provide energy until ground-based machine 406 returns to a position over inductive power transfer line 428 where energy can be obtained from inductive power transfer line 428 using inductive power transfer unit 422.

In addition to providing for alignment of the inductive power transfer units, information generated by the radio frequency identifier readers and the magnetic detection sensors also may be used for navigation. In other words, the information generated by these sensors may be used to move ground-based machine 402, ground-based machine 404, and ground-based machine 406 to desired positions in work area 400.

In this manner, the movement and location of ground-based machine 402, ground-based machine 404, and ground-based machine 406 in work area 400 is not constrained based on a path defined by inductive power transfer line 428. In other words, a ground-based machine may move off of one segment of inductive power transfer line 428 to another segment of inductive power transfer line 428 and does not have to follow inductive power transfer line 428. As a result, more flexibility is present in moving and positioning these ground-based machines when performing operations to manufacture an object.

Figure 5:
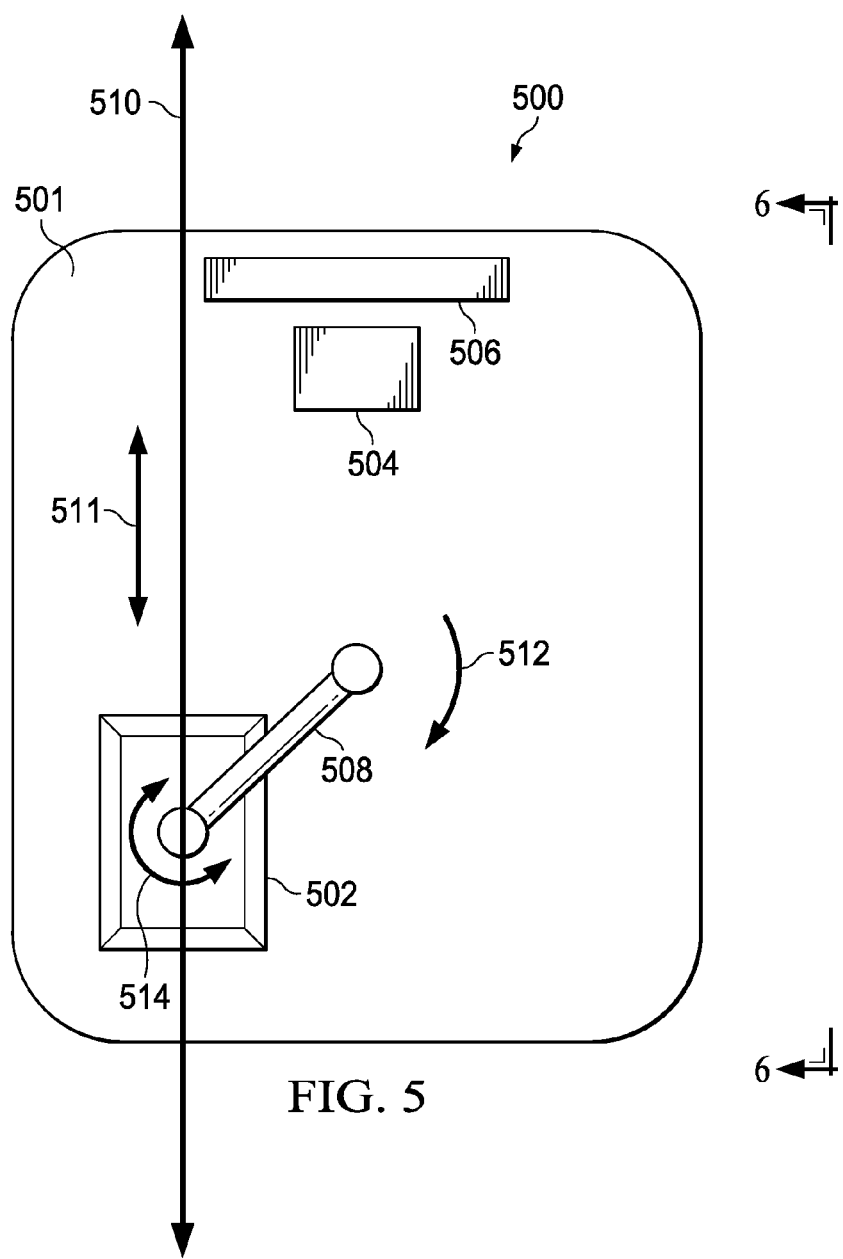
FIG. 5 is an illustration of a ground-based machine with an inductive power transfer unit in accordance with an illustrative embodiment.

Turning now to FIG. 5, an illustration of a ground-based machine with an inductive power transfer unit is depicted in accordance with an illustrative embodiment. In this illustrative example, ground-based machine 500 is shown. Ground-based machine 500 is an example of an implementation of ground-based machine 200 in FIG. 2. The view depicted in FIG. 5 is a view looking upward at bottom side 501 of ground-based machine 500.

As illustrated, ground-based machine 500 includes inductive power transfer unit 502, radio frequency identifier reader 504, magnetic detection sensor 506, and elongate member 508. These components are physically associated with ground-based machine 500.

Elongate member 508 is configured to move inductive power transfer unit 502 relative to ground-based machine 500 with respect to an inductive power transfer line on a path as indicated by arrow 510 to a desired position to obtain a desired level of energy from an inductive power transfer line in this illustrative example. In this example, this movement aligns axis 511 through inductive power transfer unit 502 with the inductive power transfer line.

Elongate member 508 may move inductive power transfer unit 502 in the direction of arrow 512 and rotate inductive power transfer unit 502 in the direction of arrow 514. In this manner, inductive power transfer unit 502 on ground-based machine 500 may be positioned in a desired position relative to the inductive power transfer line.

Figure 6:
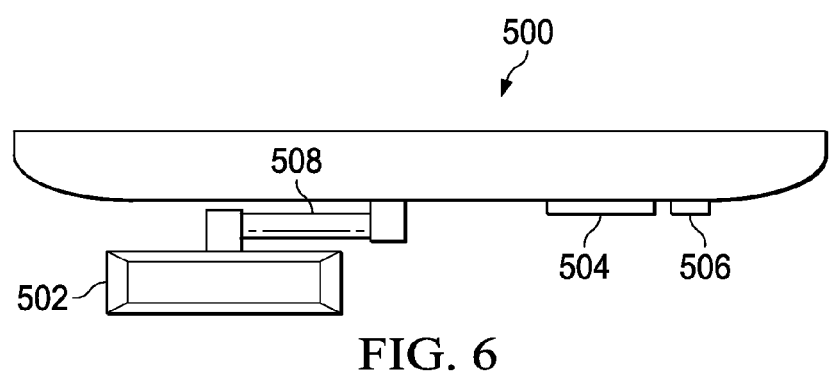
FIG. 6 is an illustration of a ground-based machine with an inductive power transfer unit in accordance with an illustrative embodiment.

With reference now to FIG. 6, an illustration of a ground-based machine with an inductive power transfer unit is depicted in accordance with an illustrative embodiment. In this illustrative example, a side view of the bottom portion of ground-based machine 500 is seen in the direction of lines 6-6 in FIG. 5.

As depicted, elongate member 508 is configured to rotate with respect to ground-based machine 500. In this manner, elongate member 508 may align inductive power transfer unit 502 with the inductive power transfer line (not shown).

Figure 7:
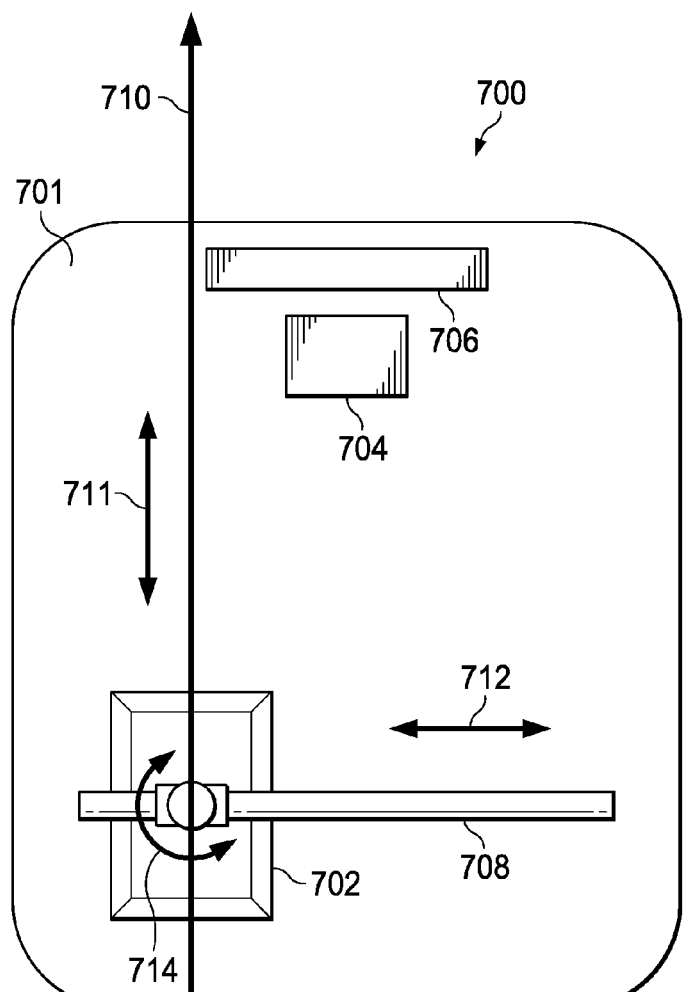
FIG. 7 is an illustration of a ground-based machine with an inductive power transfer unit in accordance with an illustrative embodiment.

Turning now to FIG. 7, an illustration of a ground-based machine with an inductive power transfer unit is depicted in accordance with an illustrative embodiment. In this illustrative example, ground-based machine 700 is shown. Ground-based machine 700 is an example of an implementation of ground-based machine 200 in FIG. 2. The view depicted in FIG. 7 is a view looking upward at bottom side 701 of ground-based machine 700.

In this illustrative embodiment, ground-based machine 700 includes inductive power transfer unit 702, radio frequency identifier reader 704, magnetic detection sensor 706, and elongate member 708. Elongate member 708 is configured to move inductive power transfer unit 702 to align inductive power transfer unit 702 with an inductive power transfer line along arrow 710 in this illustrative example. This movement causes alignment of axis 711 through inductive power transfer unit 702 with the inductive power transfer line.

As depicted, inductive power transfer unit 702 is configured to move on elongate member 708 in the direction of arrow 712. Additionally, inductive power transfer unit 702 is configured to rotate in the direction of arrow 714. A desired position of inductive power transfer unit 702 relative to the inductive power transfer line may be obtained when this type of movement of inductive power transfer unit 702 is performed.

Figure 8:
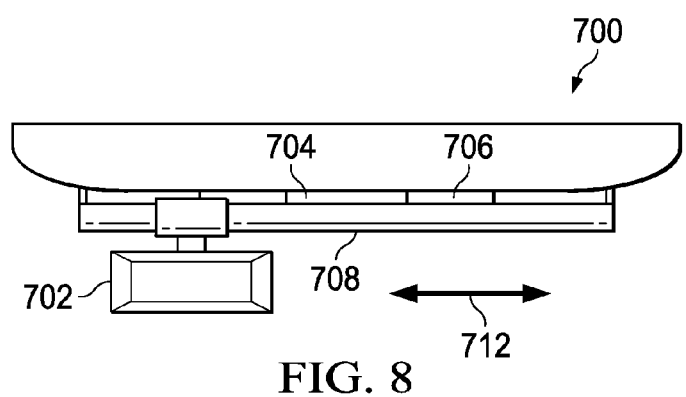
FIG. 8 is an illustration of a ground-based machine with an inductive power transfer unit in accordance with an illustrative embodiment.

With reference now to FIG. 8, an illustration of a ground-based machine with an inductive power transfer unit is depicted in accordance with an illustrative embodiment. In this illustrative example, a front view of the bottom portion of ground-based machine 700 is seen in the direction of lines 8-8 in FIG. 7.

In this illustrative example, inductive power transfer unit 702 moves in the direction of arrow 712 along elongate member 708. Additionally, inductive power transfer unit 702 rotates with respect to elongate member 708. This allows inductive power transfer unit 702 to align with the inductive power transfer line (not shown).

Figure 9:
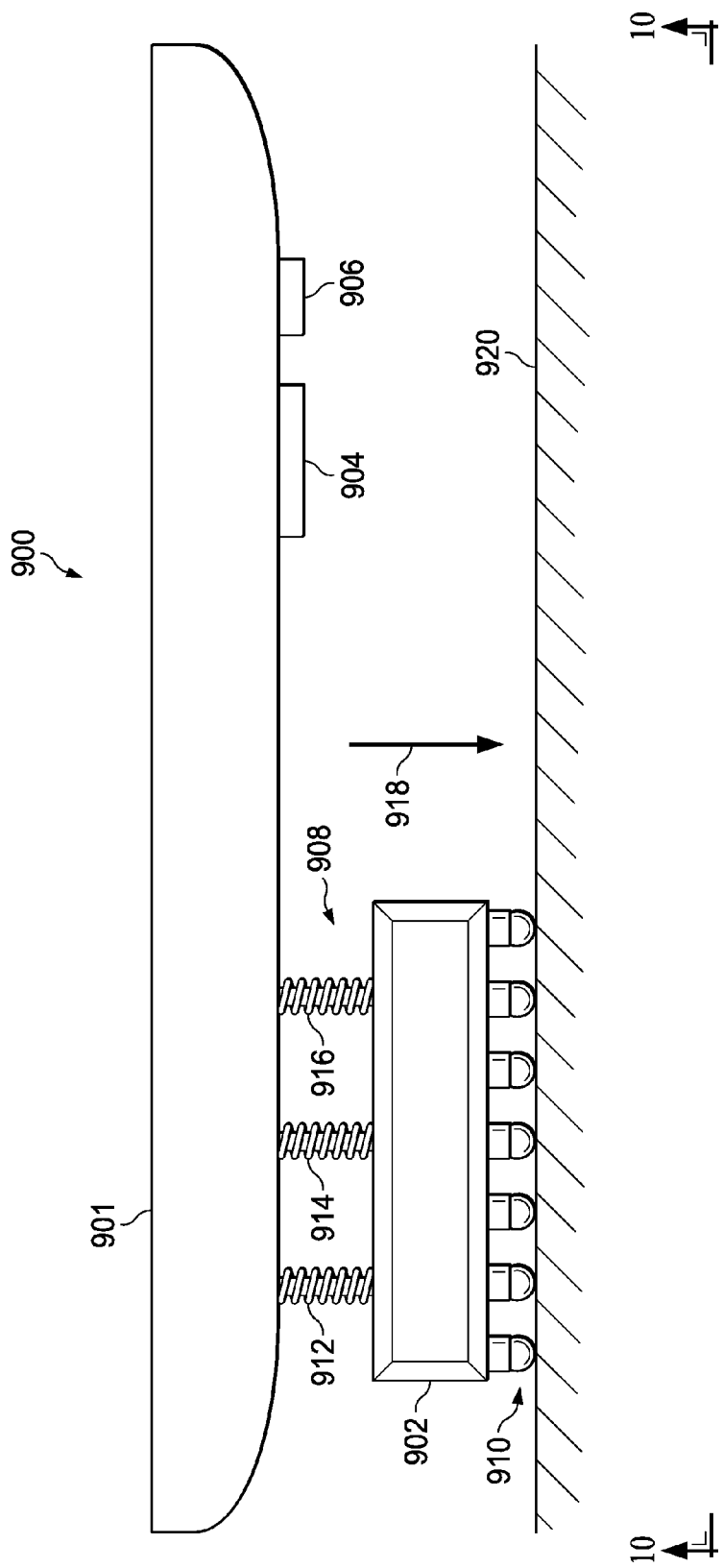
FIG. 9 is an illustration of a ground-based machine with an inductive power transfer unit in accordance with an illustrative embodiment.

Turning now to FIG. 9, an illustration of a ground-based machine with an inductive power transfer unit is depicted in accordance with an illustrative embodiment. In this illustrative example, ground-based machine 900 is shown. Ground-based machine 900 is an example of an implementation of ground-based machine 200 FIG. 2. In this illustrative example, a view of side 901 of ground-based machine 900 is shown.

In this illustrative example, ground-based machine 900 includes inductive power transfer unit 902, radio frequency identifier reader 904, magnetic detection sensor 906, biasing system 908, and array of ball bearings 910. Biasing system 908 includes spring 912, spring 914, and spring 916.

Biasing system 908 with spring 912, spring 914, and spring 916 is configured to apply force on inductive power transfer unit 902 in the direction of arrow 918. In this manner, inductive power transfer unit 902 may be pressed towards ground 920 such that inductive power transfer unit 902 maintains a constant distance to ground 920 as ground-based machine 900 moves along an inductive power transfer line, such as inductive power transfer line 428 in FIG. 4.

Array of ball bearings 910 allows inductive power transfer unit 902 to move freely with ground-based machine 900 on ground 920 as ground-based machine 900 moves along an inductive power transfer line. Additionally, array of ball bearings 910 position inductive power transfer unit 902 substantially parallel to ground 920 as force in the direction of arrow 918 is applied to inductive power transfer unit 902. In this manner, inductive power transfer unit 902 remains substantially parallel to ground 920 as inductive power transfer unit 902 on ground-based machine 900 moves on ground 920 along an inductive power transfer line.

Figure 10:
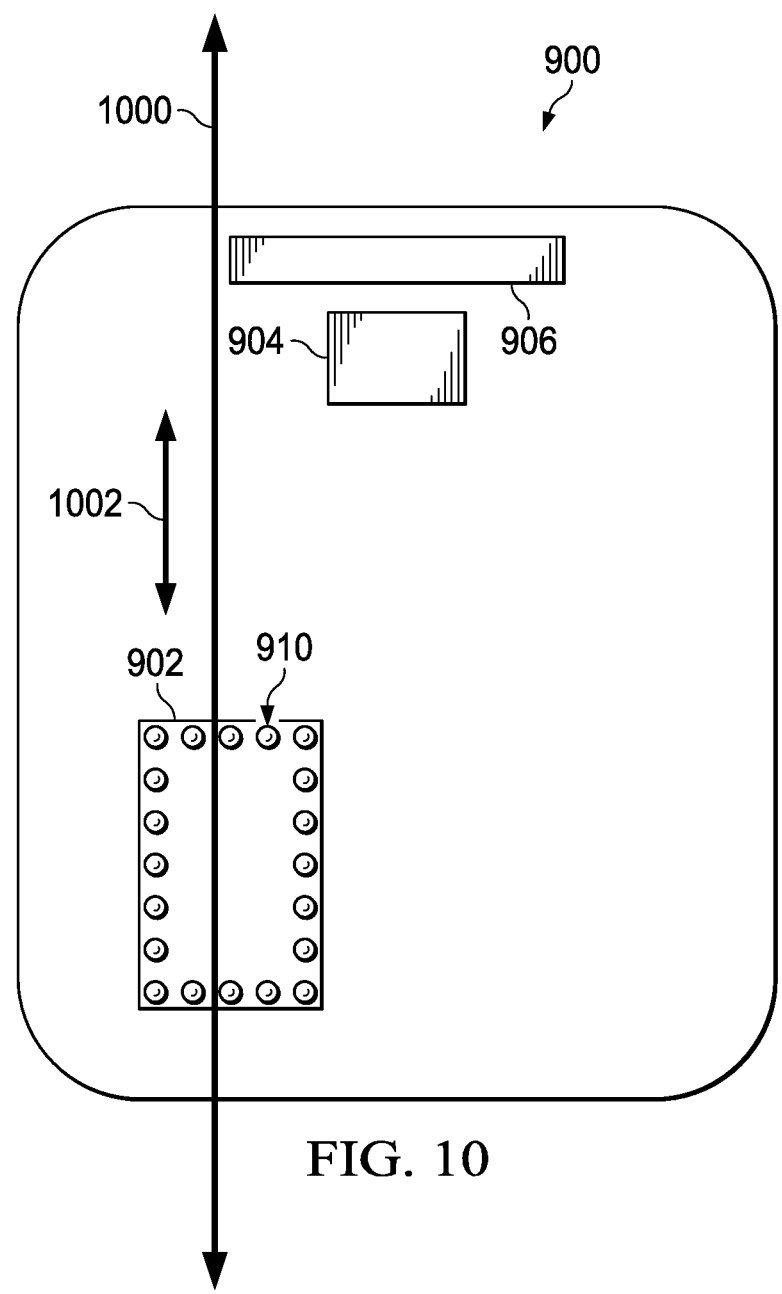
FIG. 10 is an illustration of a ground-based machine with an inductive power transfer unit in accordance with an illustrative embodiment.

With reference now to FIG. 10, an illustration of a ground-based machine with an inductive power transfer unit is depicted in accordance with an illustrative embodiment. In this illustrative example, a view of the bottom portion of ground-based machine 900 is seen in the direction of lines 10-10 in FIG. 9.

In this illustrative example, array of ball bearings 910 is shown. Array of ball bearings 910 is configured to apply a force on inductive power transfer unit 902 such that inductive power transfer unit 902 may remain at a constant distance to the ground when inductive power transfer unit 902 is aligned with an inductive power transfer line on a path as indicated by arrow 1000 along axis 1002.

Figure 11:
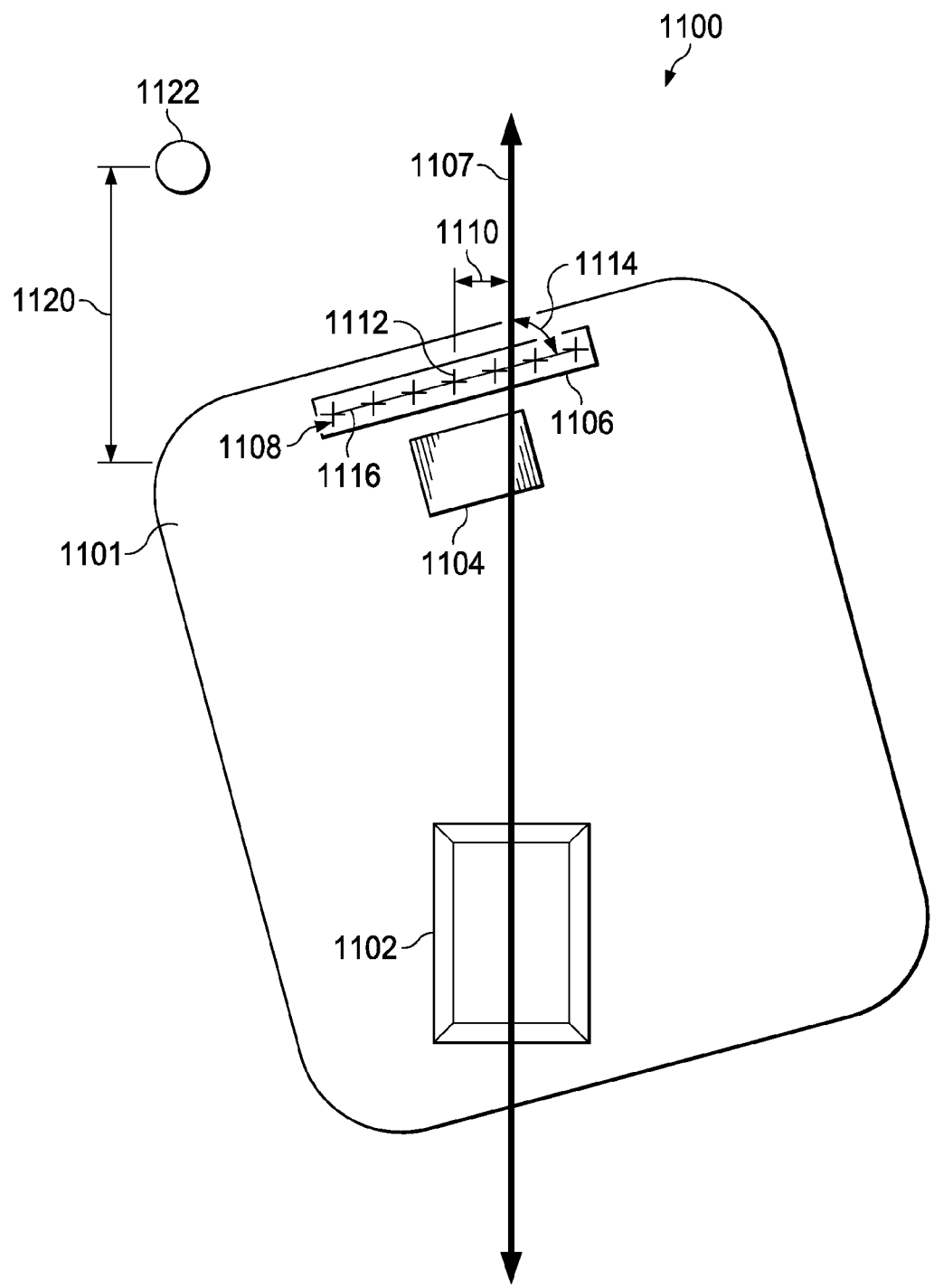
FIG. 11 is an illustration of a ground-based machine with an inductive power transfer unit in accordance with an illustrative embodiment.

Turning now to FIG. 11, an illustration of a ground-based machine with a sensor system is depicted in accordance with an illustrative embodiment. In this illustrative embodiment, ground-based machine 1100 is shown. Ground-based machine 1100 is an example of an implementation of ground-based machine 200 in FIG. 2. The view depicted in FIG. 11 is a view looking upward at bottom side 1101 of ground-based machine 1100.

In this illustrative example, ground-based machine 1100 includes a number of different components. As depicted, ground-based machine 1100 includes inductive power transfer unit 1102, radio frequency identifier reader 1104, and magnetic detection sensor system 1106.

Magnetic detection sensor system 1106 is configured to provide information about the position of ground-based machine 1100. In particular, magnetic detection sensor system 1106 may provide information about the position of ground-based machine 1100 relative to inductive power transfer line 1107. In this illustrative example, magnetic detection sensor system 1106 includes array of magnetic sensors 1108.

Each magnetic sensor in array of magnetic sensors 1108 is configured to measure the strength of the magnetic field created by inductive power transfer line 1107. With this information, the distance to each magnetic sensor in array of magnetic sensors 1108 may be calculated from the measured strength of the magnetic field at any particular array. Distance 1110 from inductive power transfer line 1107 to sensor reference frame array 1112 is determined in this manner. Distance 1110 is used to determine the distance of ground-based machine 1100 from inductive power transfer line 1107.

Additionally, array of magnetic sensors 1108 may be used to calculate angle 1114 at which ground-based machine 1100 lies with respect to inductive power transfer line 1107. The difference in the strength of the magnetic field detected by each magnetic sensor in array of magnetic sensors 1108 may be used to calculate angle 1114.

As depicted, array of magnetic sensors 1108 in magnetic detection sensor system 1106 forms reference line 1116 on ground-based machine 1100. When the magnetic sensors in array of magnetic sensors 1108 measure the strength of the magnetic field created by inductive power transfer line 1107, angle 1114 between reference line 1116 and inductive power transfer line 1107 may be determined. As a result, magnetic detection sensor system 1106 may be used to identify an orientation of ground-based machine 1100 relative to inductive power transfer line 1107.

In this illustrative example, radio frequency identifier reader 1104 is configured to measure distance 1120 between radio frequency identifier tag 1122 and radio frequency identifier reader 1104. Distance 1120 may be used to determine the location of ground-based machine 1100 along inductive power transfer line 1107.

This feature of identifying the position, orientation, or both for ground-based machine 1100 is in contrast to currently used ground-based machines with inductive power transfer lines. Currently used ground-based machines follow the inductive power transfer line when moving. As a result, the position and orientation of the ground-based machine is unnecessary with respect to moving the ground-based machine.

In contrast, a ground-based machine in an illustrative example may move from one inductive power transfer line to another inductive power transfer line within a pattern of inductive power transfer lines. In addition, the ground-based machines may move from one portion of an inductive power transfer line to another portion of the same inductive power transfer line in the pattern of the inductive power transfer lines rather than following the inductive power transfer line. This type of movement is aided through the identification of the orientation, location, or both for the ground-based machine.

The illustration of ground-based machines in FIGS. 3-11 are only presented as examples of implementations for ground-based machines 104 in FIG. 1. Further, the illustration of wing 304 in FIG. 3 is also intended as an example of one implementation for object 102 in FIG. 1. In other illustrative examples, object 102 may be a fuselage, a wing panel, an engine housing, an automotive assembly, a ship hull, or other suitable types of objects. Further, in some illustrative examples, human operators such as operator 360 and operator 362 may be absent from work area 306. In other words, the operations performed on wing 304 may be entirely automated without needing operators in work area 306.

The different components shown in FIGS. 3-11 may be combined with components in FIGS. 1 and 2, used with components in FIGS. 1 and 2, or a combination of the two. Additionally, some of the components in FIGS. 3-11 may be illustrative examples of how components shown in block form in FIGS. 1 and 2 can be implemented as physical structures.

Figure 12:
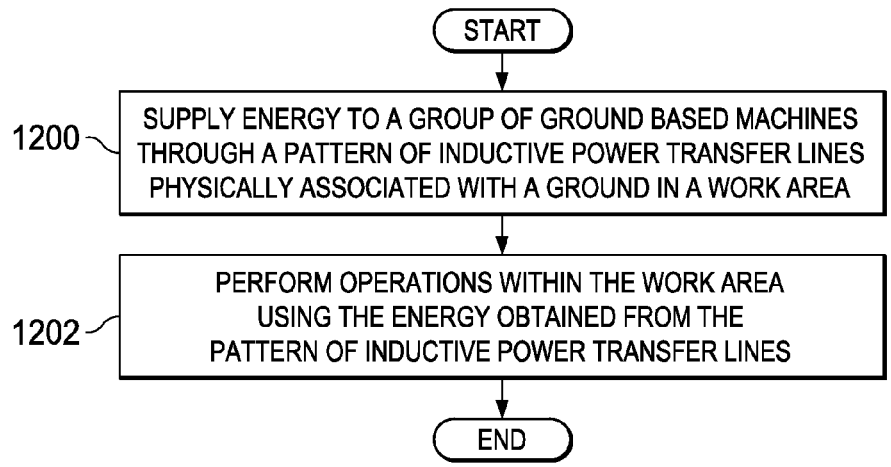
FIG. 12 is an illustration of a flowchart of a process for distributing energy to ground-based machines in accordance with an illustrative embodiment.

With reference now to FIG. 12, an illustration of a flowchart of a process for distributing energy to ground-based machines is depicted in accordance with an illustrative embodiment. The process illustrated in FIG. 12 may be implemented in manufacturing environment 100 in FIG. 1. In other illustrative examples, this process may be implemented in a maintenance environment.

The process begins by supplying energy to a group of ground-based machines through a pattern of inductive power transfer lines physically associated with a ground in a work area (operation 1200). The ground-based machines then perform operations within the work area using the energy obtained from the pattern of inductive power transfer lines (operation 1202), with the process terminating thereafter. The group of ground-based machines may move in the work area without following a path based on the inductive power transfer lines.

Figure 13:
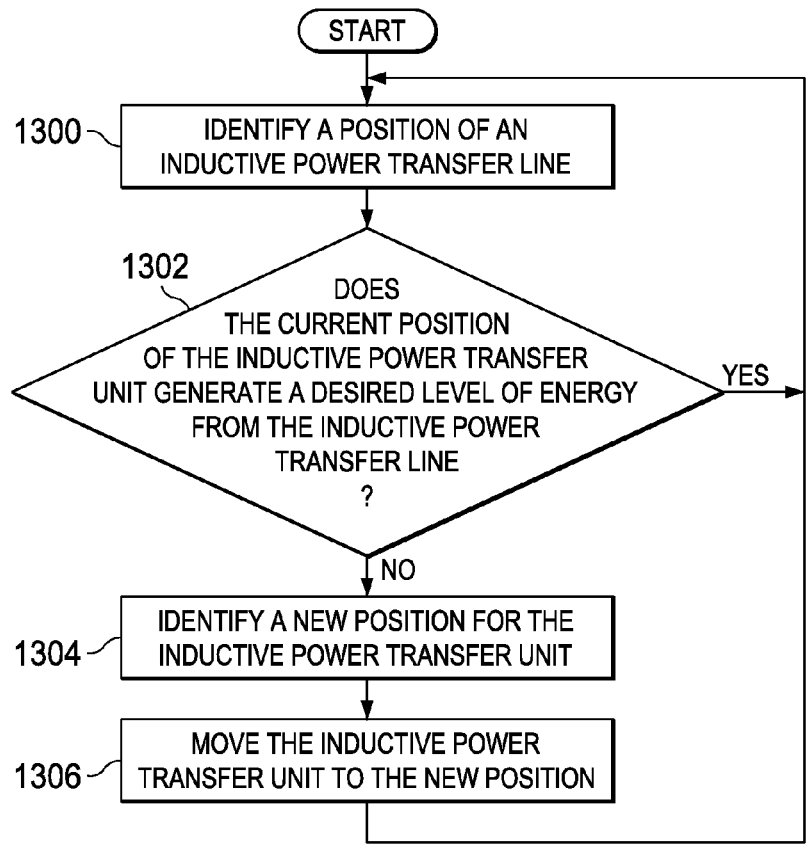
FIG. 13 is an illustration of a flowchart of a process for transferring power from an inductive power transfer line to a ground-based machine in accordance with an illustrative embodiment.

Turning now to FIG. 13, an illustration of a flowchart of a process for transferring power from an inductive power transfer line to a ground-based machine is depicted in accordance with an illustrative embodiment. The process illustrated in FIG. 13 may be implemented in ground-based machine 200 in FIG. 2. In particular, the different operations may be used to position an inductive power transfer unit in a group of inductive power transfer units in a ground-based machine. This positioning may be used to provide a desired level of energy transferred from the inductive power transfer line to the ground-based machine.

The process begins by identifying a position of an inductive power transfer line (operation 1300). The position of the inductive power transfer line may be identified using sensor system 207 in ground-based machine 200. The position may include X coordinates and Y coordinates. Additionally, the positioning also may include an orientation of the inductive power transfer line. The sensor system may include at least one of a magnetic field sensor, a radio frequency identifier reader, or some other suitable type of sensor.

A determination is made as to whether the current position of the inductive power transfer unit generates a desired level of energy from the inductive power transfer line (operation 1302). The inductive power transfer unit may include a sensor onboard that gives an indication of the output to the controller quantifying the power level attained. This indication may be, for example, binary value indicating whether the power transfer is good or bad. In another example, the indication may indicate the percent efficiency of power transfer.

If the position of the inductive power transfer unit does not generate a desired level of energy from the inductive power transfer line, the process identifies a new position for the inductive power transfer unit (operation 1304). The process then moves the inductive power transfer unit to the new position (operation 1306), with the process then returning to operation 1300.

With reference again to operation 1302, if the inductive power transfer unit generates a desired level of energy, the process also returns to operation 1300.

Figure 14:
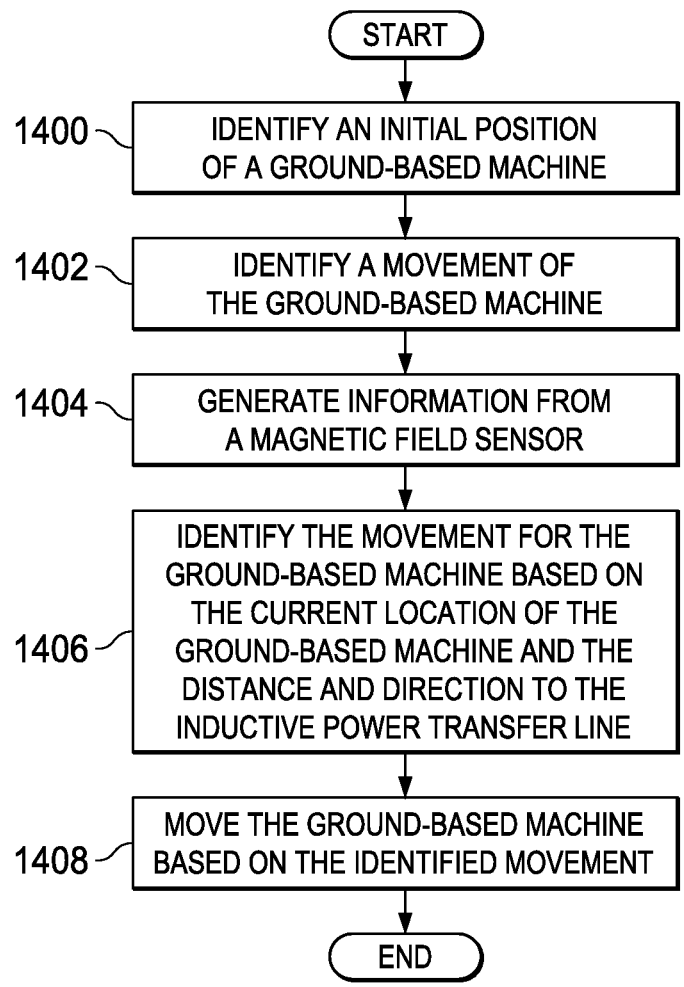
FIG. 14 is an illustration of a flowchart of a process for moving a ground-based machine in a work area in accordance with an illustrative embodiment.

Turning now to FIG. 14, an illustration of a flowchart of a process for moving a ground-based machine in a work area is depicted in accordance with an illustrative embodiment. The process illustrated in FIG. 14 may be implemented using ground-based machine 200 in FIG. 2. In this illustrative example, the process may identify movement for a ground-based machine to move the ground-based machine towards an inductive power transfer line. This process may be used when moving a ground-based machine from one portion of a pattern of inductive power transfer lines to another portion of the pattern of inductive power transfer lines.

The process begins by identifying an initial position of a ground-based machine (operation 1400). This initial position may be entered or programmed into the ground-based machine. The process then identifies a movement of the ground-based machine (operation 1402). This movement may be identified from movement of wheels, tracks, or other locomotion elements on the ground-based machine. With this movement and the initial position of the ground-based machine, a current location of the ground-based machine may be identified.

The process then generates information from a magnetic field sensor (operation 1404). The magnetic field sensor may be used to identify a distance and direction to an inductive power transfer line generating the magnetic field.

The process then identifies the movement for the ground-based machine based on the current location of the ground-based machine and the distance and direction to the inductive power transfer line (operation 1406). The process then moves the ground-based machine based on the identified movement (operation 1408), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 15:
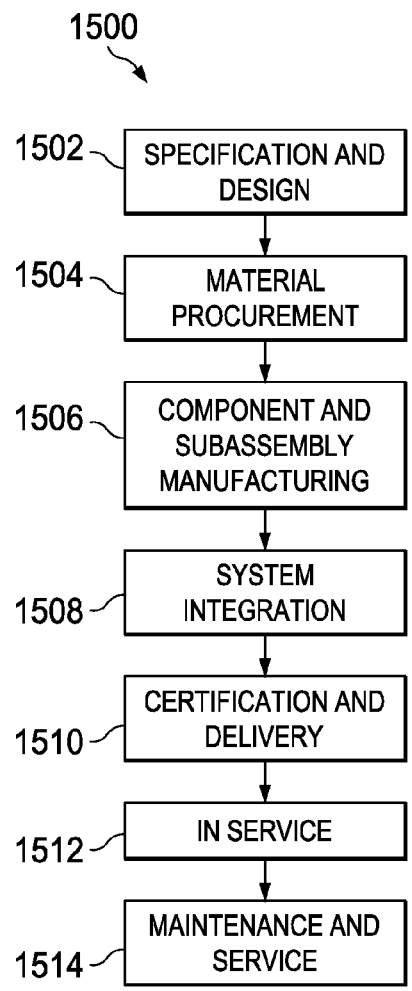
FIG. 15 is an illustration of a block diagram of an aircraft manufacturing and service method in accordance with an illustrative embodiment.
Figure 16:
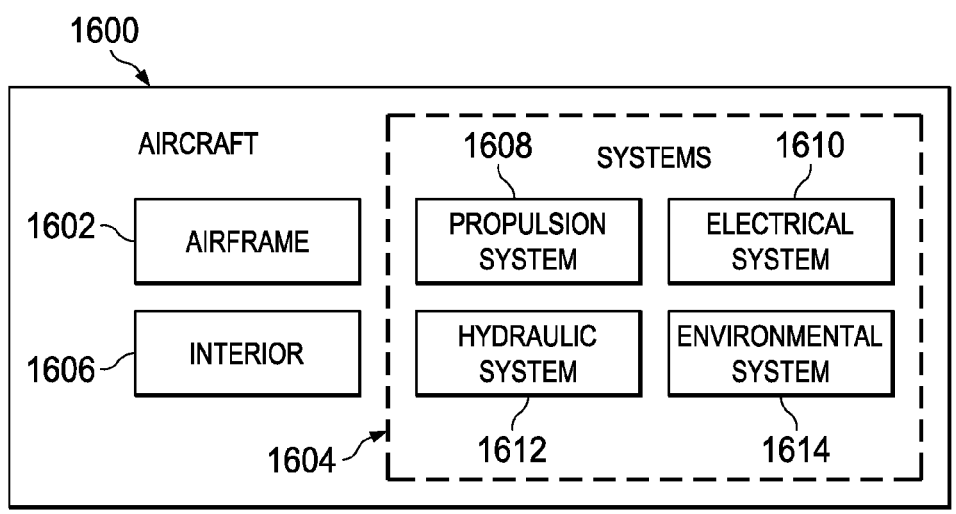
FIG. 16 is an illustration of a block diagram of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized during maintenance and service 1514 in FIG. 15. The use of a number of the different illustrative embodiments may substantially expedite the assembly of and/or reduce the cost of aircraft 1600.

Thus, the illustrative embodiments provide a method and apparatus for providing energy to ground-based machines. A pattern of inductive power transfer lines are located in a work area in which the ground-based machines perform operations. This pattern is configured such that the ground-based machines may move within the work area without being required to follow a path defined by the inductive power transfer lines.

In the illustrative examples, a ground-based machine is able to move a distance from a first inductive power transfer line to a second inductive power transfer line in the inductive power transfer lines and maintain a desired level of energy for performing operations such as the movement of the ground-based machine or other suitable operations.

In this manner, changes in the flow between work areas, the flow within work areas, or both may be made more quickly using an illustrative embodiment. These changes are more easily made as compared to currently used inductive power transfer systems because the movement of the ground-based machines in the work area is not based on paths defined using the inductive power transfer lines. Instead, ground-based machines may move within the work area without following a path defined by the inductive power transfer lines. As a result, redesigning the flow of how tasks or operations are performed in a work area does not require changing the pattern of the inductive power transfer lines within the work area.

In this manner, a more flexible manufacturing environment may be implemented using an illustrative embodiment. In this manner, changes to the manufacturing of objects such as aircraft over the lifespan of the aircraft may be implemented more easily and with less cost. Additionally, reconfiguration of a manufacturing environment may be performed more easily because movement of ground-based machines does not rely on a particular path of inductive power transfer lines.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a pattern of inductive power transfer lines physically associated with a ground in a work area; and
   a ground-based machine configured to move in the work area and comprising an inductive power transfer system on the ground-based machine and configured to obtain energy for the ground-based machine from the pattern of the inductive power transfer lines, wherein the inductive power transfer system comprises an inductive power transfer unit that is moveable on the ground-based machine with respect to the ground-based machine.

2. The apparatus of claim 1, wherein the inductive power transfer system further comprises:
   an energy storage system configured to store the energy for the ground-based machine.

3. The apparatus of claim 1, wherein the inductive power transfer system is configured to obtain energy for the ground-based machine from the pattern of the inductive power transfer lines when the ground-based machine moves without following a path corresponding to the pattern of inductive power transfer lines.

4. The apparatus of claim 2, wherein the inductive power transfer system generates first energy and the energy storage system generates second energy, wherein the energy storage system generates the second energy to perform at least one of replacing the first energy when the inductive power transfer system is unable to generate the first energy or supplementing the first energy when additional energy is needed.

5. The apparatus of claim 1, wherein a tool system on the ground-based machine obtains energy from at least one of the inductive power transfer system or an energy storage system.

6. The apparatus of claim 1 further comprising:
   a sensor system configured to identify a position of an inductive power transfer line in the pattern of the inductive power transfer lines.

7. The apparatus of claim 6, wherein the inductive power transfer system
   is configured to increase the energy obtained for the ground-based machine from the pattern of the inductive power transfer lines from a location of the position of the inductive power transfer line.

8. The apparatus of claim 6 further comprising:
   a controller configured to control movement of the ground-based machine from positions of the inductive power transfer line detected by the sensor system.

9. The apparatus of claim 1, wherein the
   inductive power transfer unit is configured to move to different positions on the ground-based machine relative to the ground-based machine to maintain a distance of the inductive power transfer unit on the ground-based machine with respect to an inductive power transfer line in the pattern of the inductive power transfer lines when the ground-based machine is moving away from or toward the inductive power transfer line.

10. The apparatus of claim 1, wherein the inductive power transfer unit is configured to move to different orientations on the ground-based machine relative to the ground-based machine to maintain alignment of the inductive power transfer unit on the ground-based machine with respect to an inductive power transfer line in the pattern of the inductive power transfer lines when the ground-based machine is moving to change an orientation of the ground-based machine with respect to the inductive power transfer line.

11. A wireless power transfer system comprising:
    a power source configured to generate energy;
    a pattern of inductive power transfer lines physically associated with a ground in a work area and connected to the power source; and
    a power system configured to obtain the energy for a ground-based machine from the pattern of the inductive power transfer lines, wherein:

the power system comprises an inductive power transfer unit that is moveable on the ground-based machine with respect to the ground-based machine; and the power system and the pattern of inductive power transfer lines are configured such that the power system obtains energy for the ground-based machine without the ground-based machine being aligned parallel to the inductive power transfer lines.

12. The wireless power transfer system of claim 11 further comprising:
the ground-based machine configured to perform operations in the work area.

13. The wireless power transfer system of claim 11, wherein the power system comprises:
an inductive power transfer system configured to obtain the energy from the pattern of inductive power transfer lines.

14. The wireless power transfer system of claim 13, wherein the power system further comprises:
an energy storage system configured to store the energy for the ground-based machine.

15. The wireless power transfer system of claim 12, wherein the operations are selected from at least one of manufacturing operations or maintenance operations.

16. The wireless power transfer system of claim 11, wherein the power system comprises:
an inductive power transfer unit physically associated with the ground-based machine, wherein the inductive power transfer unit is configured to move relative to the ground-based machine with respect to an inductive power transfer line in the pattern of inductive power transfer lines to a desired position to obtain a desired level of energy from the inductive power transfer line.

17. A method for distributing energy to a ground-based machine the method comprising:
supplying the energy to the ground-based machine through a pattern of inductive power transfer lines physically associated with a ground in a work area;
moving an inductive power transfer unit physically associated with the ground-based machine relative to the ground-based machine; and
performing operations with the ground-based machine in the work area, wherein the ground-based machine obtains energy without being aligned parallel to the pattern of inductive power transfer lines.

18. The method of claim 17,
wherein the inductive power transfer unit is configured to move relative to the ground-based machine with respect to an inductive power transfer line in the pattern of the inductive power transfer lines to a desired position to obtain a desired level of energy from the inductive power transfer line.

* * * * *